United States Patent
Zhou et al.

(10) Patent No.: US 7,392,238 B1
(45) Date of Patent: Jun. 24, 2008

(54) METHOD AND APPARATUS FOR CONCEPT-BASED SEARCHING ACROSS A NETWORK

(75) Inventors: Joe F. Zhou, Beijing (CN); Weiquan Liu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 10/018,518

(22) PCT Filed: Aug. 23, 2000

(86) PCT No.: PCT/CN00/00246

§ 371 (c)(1),
(2), (4) Date: Jul. 12, 2002

(87) PCT Pub. No.: WO02/27541

PCT Pub. Date: Apr. 4, 2002

(51) Int. Cl.
*G06F 17/30* (2006.01)
*G06F 7/00* (2006.01)

(52) U.S. Cl. .................... 707/3; 707/2; 707/10

(58) Field of Classification Search ............ 707/2, 707/3, 10
See application file for complete search history.

(56) References Cited

U.S. PATENT DOCUMENTS

| | | | | |
|---|---|---|---|---|
| 5,864,871 A | * | 1/1999 | Kitain et al. | 707/104.1 |
| 5,926,811 A | * | 7/1999 | Miller et al. | 707/5 |
| 5,933,822 A | * | 8/1999 | Braden-Harder et al. | 707/5 |
| 5,987,460 A | * | 11/1999 | Niwa et al. | 707/6 |
| 6,006,225 A | * | 12/1999 | Bowman et al. | 707/5 |
| 6,026,388 A | * | 2/2000 | Liddy et al. | 707/1 |
| 6,028,605 A | * | 2/2000 | Conrad et al. | 715/840 |
| 6,038,560 A | * | 3/2000 | Wical | 707/5 |
| 6,094,649 A | * | 7/2000 | Bowen et al. | 707/3 |
| 6,094,652 A | * | 7/2000 | Faisal | 707/5 |
| 6,101,491 A | * | 8/2000 | Woods | 707/3 |
| 6,101,503 A | * | 8/2000 | Cooper et al. | 707/104.1 |
| 6,163,778 A | * | 12/2000 | Fogg et al. | 707/10 |
| 6,169,986 B1 | * | 1/2001 | Bowman et al. | 707/5 |
| 6,460,029 B1 | * | 10/2002 | Fries et al. | 707/3 |
| 6,510,406 B1 | * | 1/2003 | Marchisio | 704/9 |
| 6,665,665 B1 | * | 12/2003 | Ponte | 707/5 |
| 2002/0059161 A1 | * | 5/2002 | Li | 707/1 |

OTHER PUBLICATIONS http://web.archive.org/web/20000815211428/http://www.monash.com/spidap4.html. Linda Barlow, copyright, 1996-1999. All rights reserved. Updated Apr. 11, 2000.*

* cited by examiner

*Primary Examiner*—Apu Mofiz
*Assistant Examiner*—Cindy Nguyen
(74) *Attorney, Agent, or Firm*—Blakely, Sokoloff, Taylor & Zafman LLP

(57) ABSTRACT

According to one embodiment of the invention, a method includes receiving a search term for a query. The method also includes searching a network of concept terms for terms related to the search term. Additionally, the query is reformulated using the search term and the related terms. A local database is searched for data terms that match the search term and the related terms. The data terms are from documents residing on websites located on servers across a network. Moreover, the method includes retrieving the documents from the websites whose data terms match the search term and the related terms.

26 Claims, 7 Drawing Sheets

METHOD AND APPARATUS FOR CONCEPT-BASED SEARCHING ACROSS A NETWORK

FIELD

The invention relates to searching across a network. More specifically, the invention relates to a method and apparatus for a concept-based search across a number of web sites within a network.

BACKGROUND

With the advent of the Internet and the World Wide Web (WWW), the vast amount of information available across the different web sites on the Internet continues to grow as the number of networks and servers connected thereto continue to increase on a global scale. Accordingly, the availability of this information on the Internet enables users to obtain such information quickly. However, locating such information on the Internet can sometimes be difficult because of the vast numbers of websites available.

Currently, particular web sites on the WWW include search mechanisms termed "search engines" that have been developed in order to assist the users of the WWW in locating specific information therein. In particular, software programs, termed crawlers or spiders, automatically traverse, on a periodic basis, the WWW through the different web sites located thereon based on hyperlinks among the different web sites. When these software programs locate a web site whose information is not stored in the local database for this particular search engine, such programs transmit keywords and other relevant information concerning the new web site back to the web site executing these programs. Accordingly, this information about the new websites is stored into the local database for the search engine website.

Moreover, because of the dynamic nature of the WWW, these software programs also update such relevant information concerning a web site whose information is already stored in the search engine's local database. Accordingly, these search engine web sites store these search terms in a local database with other search terms from other websites. In operation, a user of these search engines enters a search query into the search engine and based on this local database, the search engine locates web pages on different web sites whose search terms include the search query and retrieves portions of these web pages. The search engine then displays these portions of the web pages to the user, thereby allowing the user to select from among the different web pages.

Additionally, another type of search engine for the WWW performs a search among the search engine results described above. In particular, these type of search engines perform a search among the individual search engines as described above and combines the results from these individual search engines into a combined results, thereby allowing the user to obtain results from across multiple search engines for a single search query.

BRIEF DESCRIPTION OF THE DRAWINGS

Embodiments of the invention may be best understood by referring to the following description and accompanying drawings which illustrate such embodiments. In the drawings.

DETAILED DESCRIPTION

In the following description, numerous specific details are set forth to provide a thorough understanding of the invention. However, it is understood that the invention may be practiced without these specific details. In other instances, well-known structures and techniques have not been shown in detail in order not to obscure embodiments of the present invention.

Figure 1:
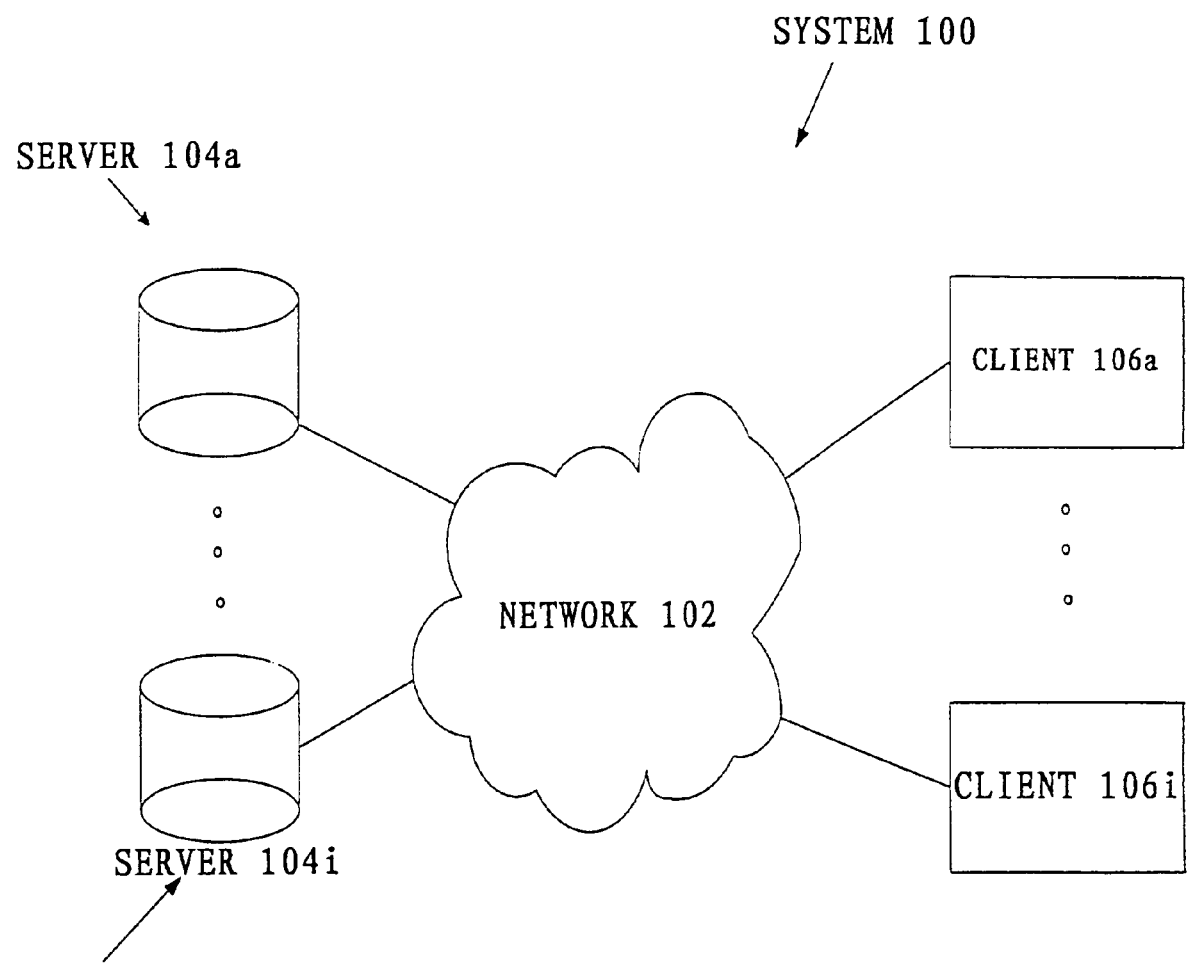
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes servers 104a–i and clients 106a–i, which are coupled together through network 102. Servers 104a–i can include one to any number of such servers in system 100. In an embodiment, servers 104a–i are host computers, which store different types of data information including one to a number of different web sites with each web site have one to a number of web pages thereon. Additionally, clients 106a–i can include one to any number of such clients in system 100. Clients 106a–i are client computers that have the network capability to connect to servers 104a–i through network 102.

While different embodiments of the present invention could include different types of networks, in an embodiment, network 102 is the Internet that includes the WWW. However, embodiments of the present invention could include other types of networks. For example, in one embodiment, network 102 is a local area network (LAN). In another embodiment, network 106 is a wide area network (WAN). Further, network 106 can be a combination of different networks that provide communication among servers 104a–i and clients 106a–i. In operation for a given client, such as client 106a, connecting to a given server, such as server 104a, client 106a connects to server 104a through network 102 and is able to download and upload different web pages from and to different websites residing on server 104a.

Figure 2:
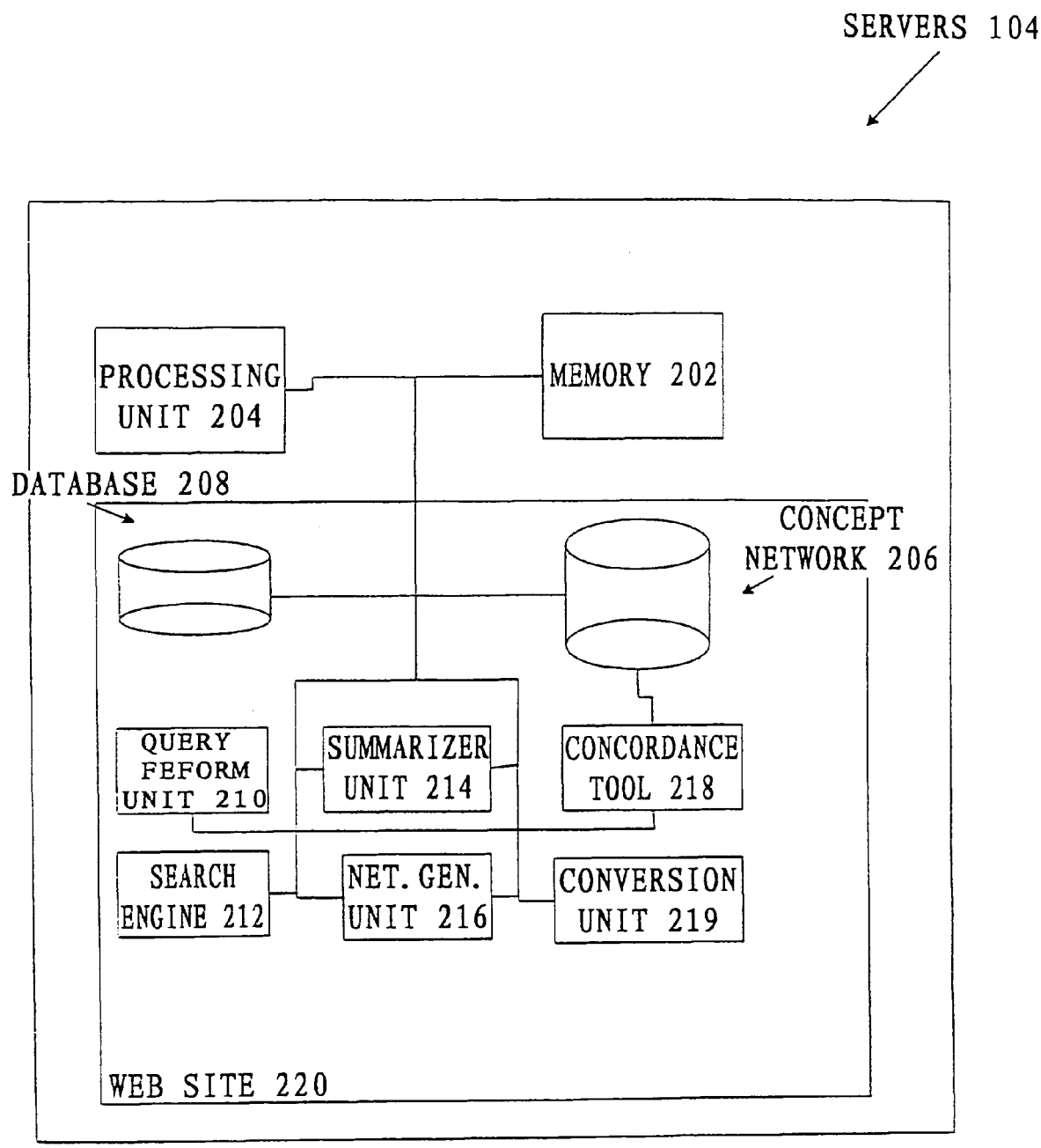
FIG. 2 illustrates one of servers 104a–i that include embodiments of the present invention.

FIG. 2 illustrates one of servers 104a–i (hereinafter "servers 104") that include embodiments of the present invention. As shown, servers 104 include processing unit 204, memory 202 and website 220. Additionally, website 220 includes database 208, concept networks 206, query reformulation unit 210, summarizer unit 212, search engine 214, network generation unit 216 and concordance tool 218, which are coupled together as shown. The following description of servers 104 is in terms of a particular web site on servers 104. However, the capability and/or functionality of servers 104 are not so limited, as servers 104 can service and/or host a number of web sites, which clients 106a–i (hereinafter "clients 106") can access across network 102.

Database 208 and concept networks 206 are associated with website 220, which is stored on servers 104. In particular, website 220 acts as a search engine that enables clients 106 to search web pages on the local server, which stores this website, as well as remote servers coupled to network 102. In particular, website 220 is a search engine that allows the users thereof to enter search terms on a given web page and have this search engine return the results of a search. Additionally, concept networks 206 are defined to include one to any number of networks, whose creation is described in more detail below in conjunction with FIG. 6. In an embodiment, each network within concept networks 206 is related to a given subject matter domain. For example, one network relates to computers, while another network in concept networks 206 relates to shoes.

Moreover, servers 104 include query reformation unit 210, search engine unit 212, summarizer 214, network generation unit 216 and concordance tool 218, which, in one embodiment, are software programs that reside in memory 202 and processing unit 204 during their execution on processing unit 204. Query reformation unit 210, search engine unit 212, summarizer 214, network generation unit 216 and concordance tool 218 will be described in more detail below. In conjunction with system 100 of FIG. 1 and the more detailed illustration of servers 104 of FIG. 2, a method of operation of system 100 in accordance with embodiments of the present invention will now be described with reference to the flow chart shown in FIG. 3.

Figure 3:
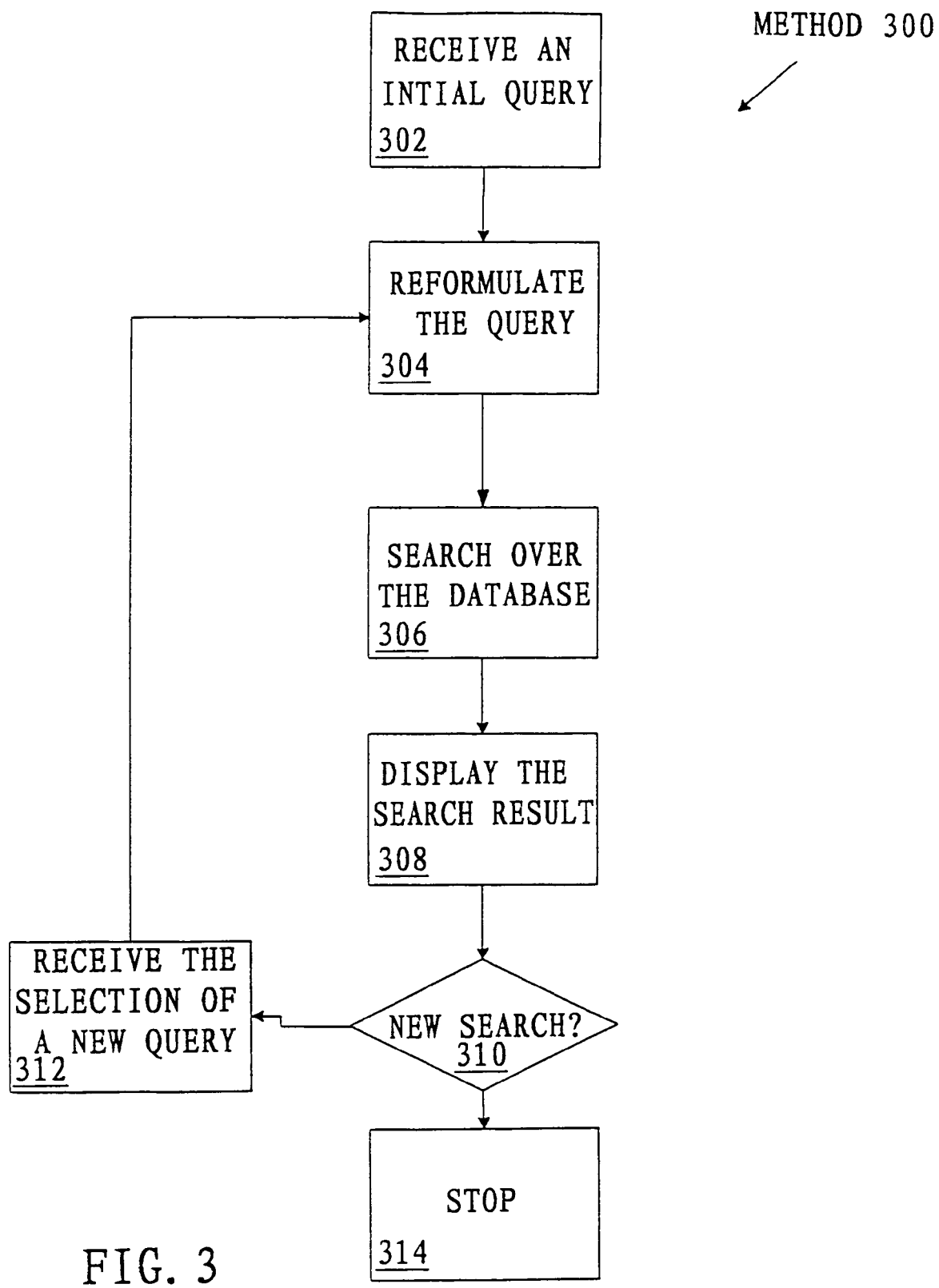
FIG. 3 is a flowchart illustrating a method for performing an expansive search for data information across servers 104 coupled to network 102, according to embodiments of the present invention.
Figure 4:
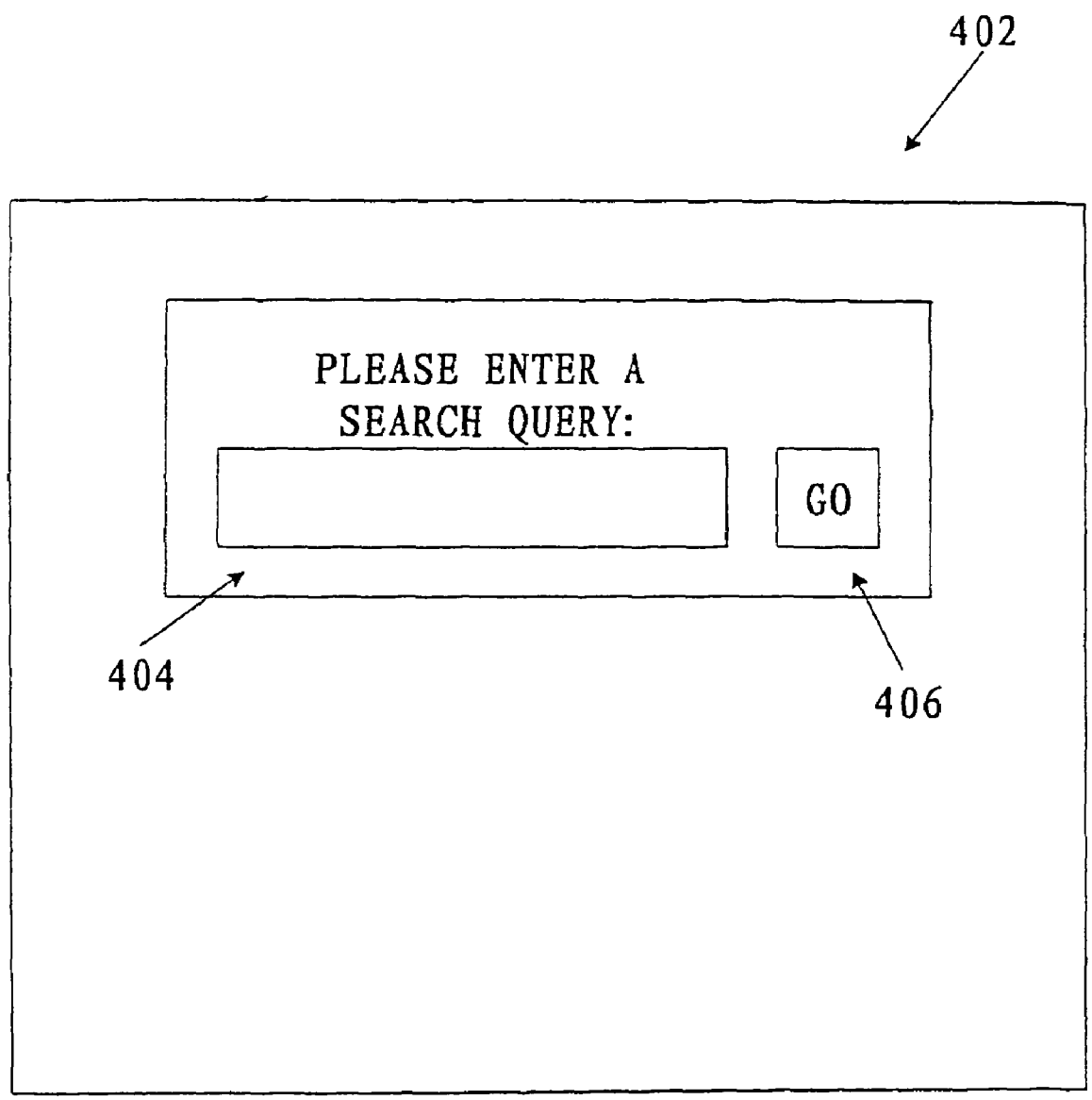
FIG. 4 illustrates a web page for entering a search term or phrase by clients 106.

In particular, FIG. 3 is a flowchart illustrating a method for performing an expansive search for data information, such as documents within web pages, across servers 104 coupled to network 102, according to embodiments of the present invention. FIG. 3 illustrates method 300 that commences with the receipt of an initial search query, at process block 302. FIG. 4 illustrates a web page for entering a search term or phrase by clients 106. In particular, FIG. 4 illustrates web page 402 that includes box 404 for entering the search term or phrase and go button 406 to initialize the search. Once client 106 enters a search term or phrase into box 404 and presses go button 406, web page 402 is transmitted back to server 104, which receives this initial search query, as shown at process block 302.

Figure 5:
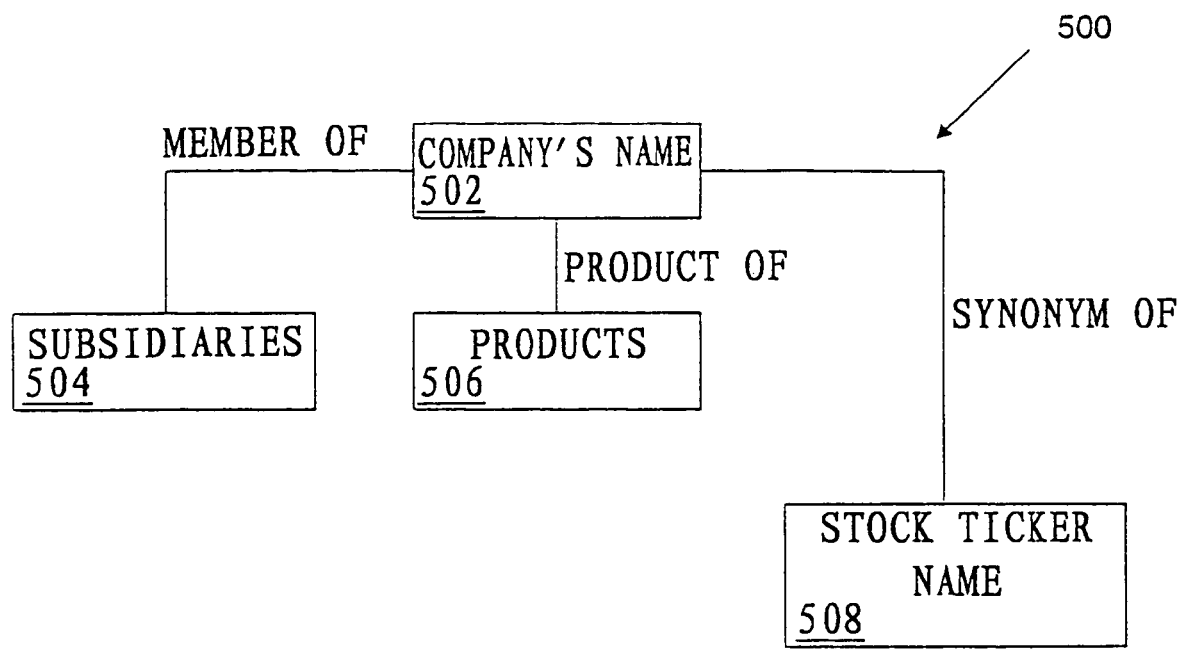
FIG. 5 illustrates an example of a portion of a network of conceptual terms, according to embodiments of the present invention.

Upon receiving this initial search query, server 104 reformulates this query, at process block 304. In particular, server 104 searches a network within concept networks 206 to find terms related to the initial search term or phrase. FIG. 5 illustrates an example of a portion of a network within concept networks 206, according to embodiments of the present invention. As shown, FIG. 5 includes network portion 500 that includes company's name 502, the company's subsidiaries 504, the company's products 506 and the company's stock ticker name 508, which are linked together. For example, network portion 500 could include the term "INTEL®" (company's name 502). Accordingly, company's products 506 could include the term "PENTIUM®" as one of the name of the processors that INTEL® produces. Moreover, network portion 500, in this example, would include "INTC" as stock ticker name 508.

Moreover as shown in FIG. 5, each pair of related terms in the network is connected by a link that specifies the semantic relationship between the related terms. As illustrated, products 506 are products of company's name 502. Additionally, subsidiaries 504 are members of company's name 502. Network portion 500 also includes a synonym relationship for denoting a similar name or phrase to a given name. In particular, stock ticker name 508 is a synonym of company's name 502. Embodiments of the present invention are not limited to the examples of semantic relationships illustrated in network portion 500. For example, another type of semantic relationship that can be incorporated into embodiments of the present invention is a canonical one. In particular, a canonical relationship is defined as the simplest form of a given word. For example, the simplest form of a telephone is a communication device.

"Hyponym of" is another example of a semantic relationship. A hyponym relationship denotes a relationship of a subcategory to a more general class. An illustration of a hyponym is a chair being a subcategory of furniture. Moreover, another semantic relationship is a hypernym one, which is a relationship of a general class to a subcategory. For example, automobile is a hypernym of a car. Further, another semantic relationship between the terms within the network is a "part" relationship. For example a between the terms within the network is a "part" relationship. For example a bicycle tire is part of a bicycle. Accordingly, each link with concept networks 206 includes a description of the semantic relationship between the two terms. Moreover, the above-described semantic relationships are by way of example and not by way of limitation as other semantic relationships can be formed between the key term and the related terms within concept networks 206.

Figure 6:
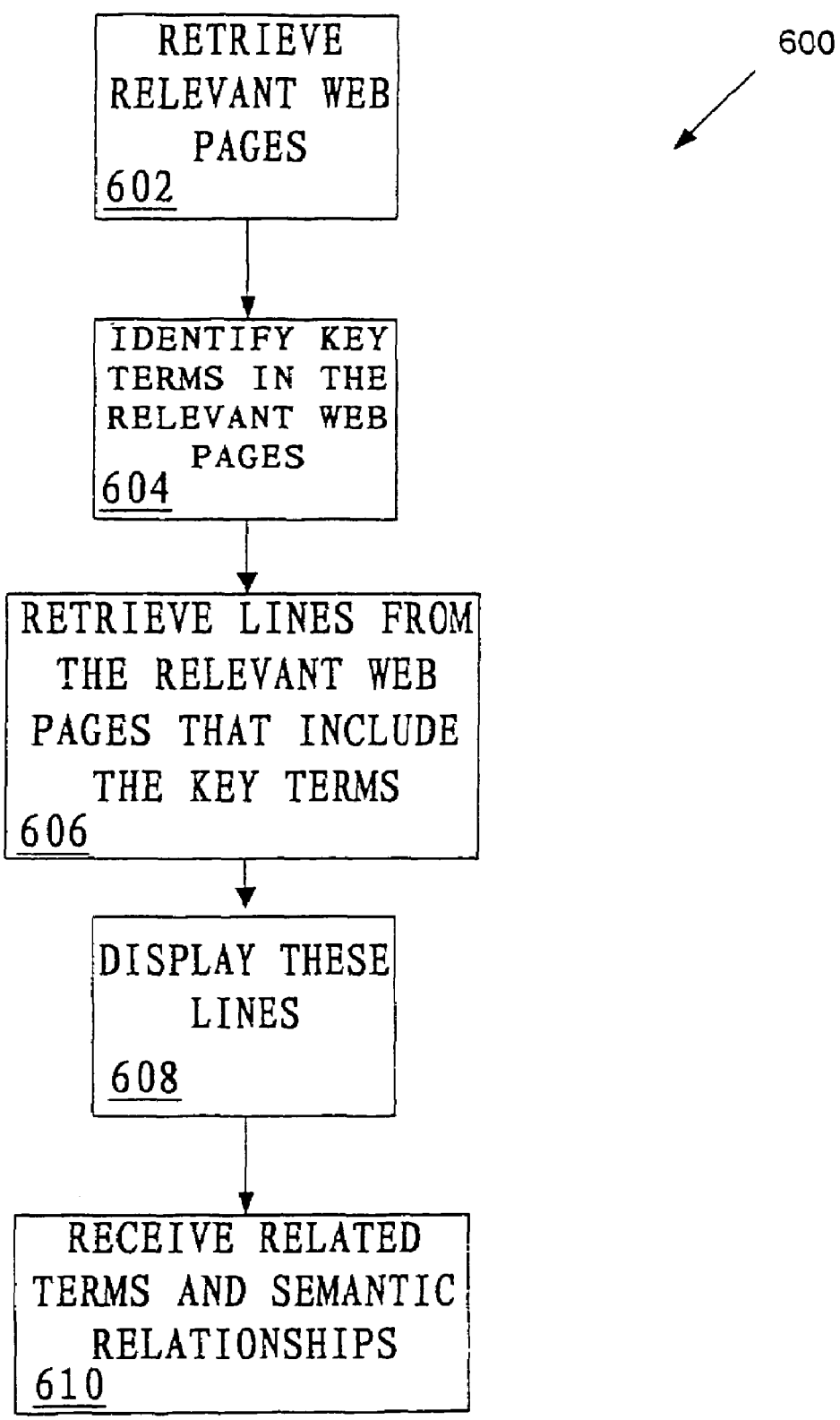
FIG. 6 illustrates a method for the formation of concept networks 206, according to embodiments of the present invention.

FIG. 6 illustrates a method for the formation of concept networks 206, according to embodiments of the present invention. The description of FIG. 6 is in terms of the formation of a single network within concept networks 206. This is by way of example and not by way of limitation, as the method described in conjunction with FIG. 6 relates to the generation of any number of networks within concept networks 206. Moreover, in an embodiment, each network within concept networks 206 is related to a given subject matter domain, such as computers or shoes.

Method 600 of FIG. 6 commences with the retrieval of relevant web pages from across different web sites located on servers 104 coupled to network 102, at process block 602. In particular, network generation unit 216 traverses servers 104 across network 102 to locate the relevant web sites for the given subject matter domain for this given network within concept networks 206, as in one embodiment, each network in concept networks 206 is related to a particular subject matter domain. In one embodiment, in order to determine whether a web page is considered relevant, network generation unit 216 is given certain terms, which if found in the web page would classify the web page as relevant. For example, if "computers" is the subject matter domain, these certain terms could include computer, processor, software, INTEL® etc. However, embodiments of the present invention are not so limited, as other techniques for classifying web pages as relevant can be incorporated into embodiments of the present invention. For example, a data analyst could perform a manual search across the different web sites and determine which web pages are considered relevant.

Upon retrieving the relevant web pages, network generation unit 216 identifies the key terms in the relevant web pages, at process block 604. In an embodiment, prior to identifying the key terms, network generation unit 216 filters out "noise" words from these relevant web pages. "Noise" words include common articles, conjunctions and/or prepositions. Examples of common articles include "a", "an" and "the", while examples of conjunctions include "and", "or" and "nor". Moreover, examples of prepositions include "of", "in" and "for". However, "noise" words are not limited to those described above, as any other words that do not carry meaning in terms of the content of the web page can be so classified.

In one embodiment, network generation unit 216 identifies these key terms employing a statistical frequency analysis of the relevant web pages. In particular, network generation unit 216 performs an analysis for each of the relevant web pages to determine the frequency of the different words and/or phrases therein. Accordingly, network generation unit 216 labels the key terms of these relevant web pages as those which occur most frequently therein. In one embodiment, the number of key terms to be identified is predetermined. For example, network generation unit 216 could identify the ten most frequent terms and/or phrase. However, embodiments of the invention are not so limited, as other techniques can be employed to determine whether a terms and/or phrase occurs frequently enough to be denoted as "key". For example, in an embodiment, the key terms and/or phrases are those which occur "x" number of times within the given web page.

In one embodiment, network generation unit 216 identifies these key terms employing a weighting algorithm with regard to the relationship of two terms within a given web page. In one such embodiment, a weight related to the mutuality between two words is assigned to the terms of the given web page based on equation #1 shown below:

$$MI(x,y)=f(x,y)/f(x)+f(y)-f(x,y) \qquad \text{(Equation \# 1)}$$

Mutual Information (MI) for two words (x and y) define the mutuality between x and y, as is known in the art. In particular, f(x) is the occurrence frequency of word x, while f(y) is the occurrence frequency of word y. Moreover, f(x,y) is the occurrence frequency of the word pair (x,y). The higher the value of MI(x,y) is, the more likely x and y are to form a compound phrase (i.e., the key phrase) within a given web page or document.

Accordingly, network generation unit 216 identifies these key terms based on the weights related to mutuality assigned by equation #1 to the terms within the given web page. In one embodiment, network generation unit 216 employs both the statistical frequency analysis and the weighting algorithm together to determine the key terms within each of the relevant web pages. These identified key terms are also known as anchor terms for their subsequent incorporation into the network of concept networks 206.

Upon identification of the key or anchor terms for a given subject matter domain, network generation unit 216 passes these terms into concordance tool 218. Accordingly, a data or text analyst uses concordance tool 218 to identify related terms to these anchor terms. In one embodiment, data analyst in conjunction with concordance tool 218 performs an analysis for a given key or anchor term separate from an analysis of other such terms. In particular, concordance tool 218 retrieves lines from the relevant web pages that include the key or anchor term, at process block 606. Such lines can be sentences or portions of sentences that include the key or anchor term from the relevant web pages. Additionally, these lines are displayed to a data analyst, who can select terms related to the key or anchor term, at process block 608.

Figure 7:
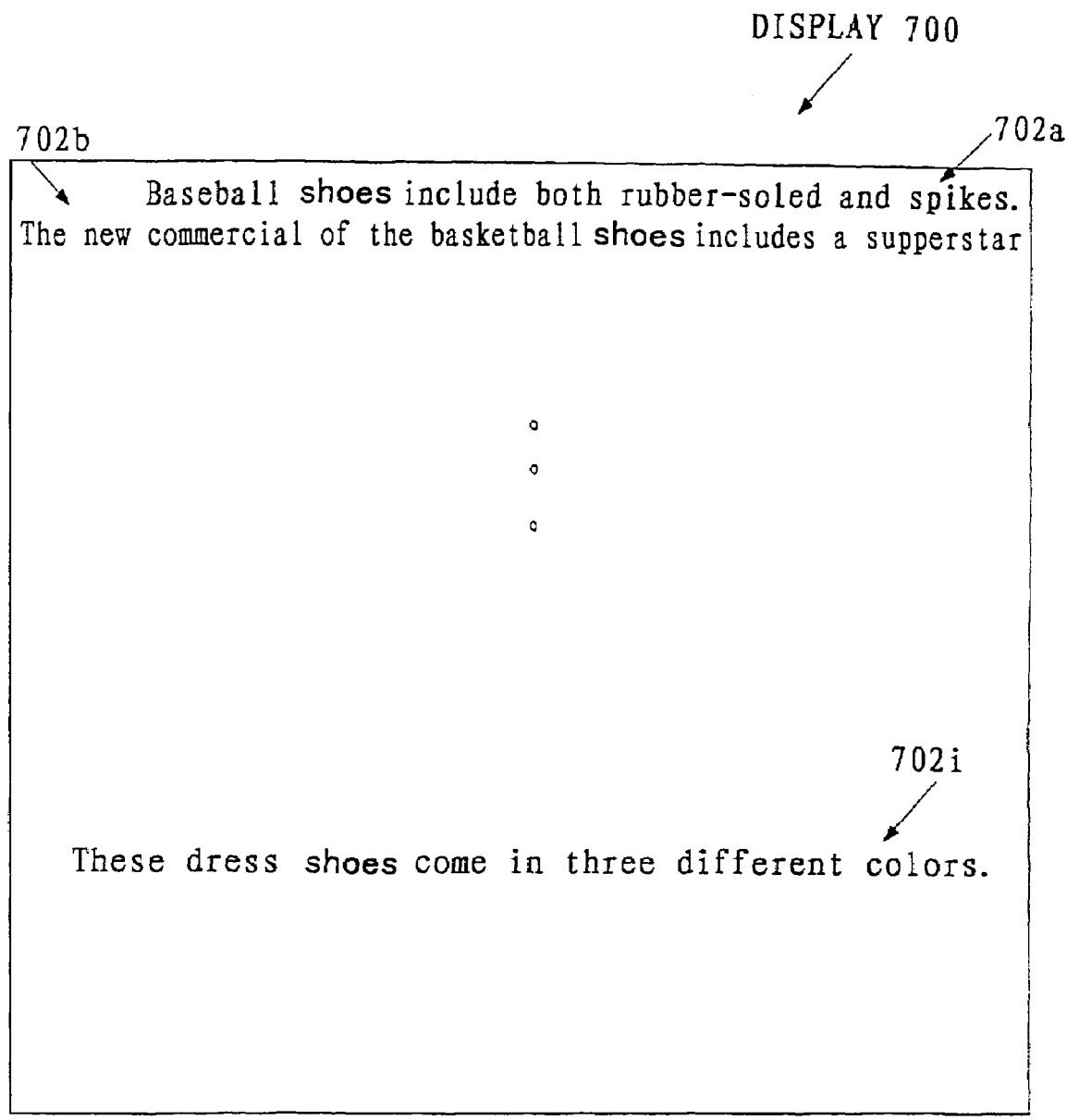
FIG. 7 illustrates a display of the output of concordance tool 218 used by a data analyst to identify terms related to a given anchor term.

In particular, FIG. 7 illustrates a display of the output of concordance tool 218 used by a data analyst to identify terms related to a given anchor term. As shown, FIG. 7 illustrates display 700, which includes lines 702a–702i. Lines 702a–i can include one to any number of lines across multiply display screens. While different embodiment can include different display techniques of lines 702a–702i, as shown in display 700, in one embodiment, the anchor term is centered in the middle of display 700 for each of lines 702–702i, thereby allowing the data analyst to see the context in which the anchor terms are being used.

Additionally, in one embodiment, concordance tool 218 arranges lines 702a–702i in alphabetical order according to the word just prior to the anchor term, as illustrated in display 700. In an alternative embodiment, concordance tool 218 arranges lines 702a–702i in alphabetical order according to the word just subsequent to the anchor term. These above-described orderings of lines 702a–702i are by way of example and not by way of limitation, as embodiments of the present invention can provide other ordering techniques, such as a random order.

Upon displaying of the lines that include the anchor terms, the data analyst employing concordance tool 218 can select terms related to these anchor terms. Returning to display 700, a given data analyst could select "baseball", "rubber-soled" and "spikes" from line 702a as being related terms. Moreover, in one embodiment, the data analyst defines a semantic relationship for each related term and the particular anchor term. Examples of such semantic relationships are described above in conjunction with FIG. 5. Accordingly, the given data analyst selects the related terms as well as the semantic relationships for a particular anchor term based on lines 702a–702i. Concordance tool 218 receives these related terms and the semantic relationships for a particular key or anchor term, at process block 610. Additionally, the above-described method 600 is reiterated for each anchor or key term within a given network within concept networks 206. Accordingly, a given network within concept networks 206 is generated based on these different anchor or key terms along with their related terms and the semantic relationships there between. In particular, returning to FIG. 5, network portion 500 illustrates a portion of a network for a given subject matter domain, as one to any number of key terms can be incorporated into a given network.

Returning to process block 304 of FIG. 3 for the reformulation of the search query, in operation, upon receipt of the initial search term or phrase, server 104 searches concept networks 206 for related terms or phrases. Returning to the example illustrated in FIG. 5, if client 106 entered the initial search term "INTEL®", server 104 could revise this initial search query to include any subsidiaries, products and the stock ticker name of INTEL® stored in network portion 500. While different embodiments of the present invention can couple these search terms in different formats to generate a different search query, in one embodiment, these search terms are coupled using an "AND" search operator. For example, if server 104 received the search term "INTEL®" and located the related terms "PENTIUM®" and "INTC" in network portion 500, the reformulated search query would be "INTEL® and PENTIUM® and INTC". Accordingly for this reformulated search query, all the terms must be located in a given web page before a match is made.

However, embodiments of the present invention are not so limited, as any other search operator can be incorporated into the reformulated search query at process block 304. For example, other search operators to connect the initial search term with the related search terms could include OR, NOT, NEAR, etc. The search operator "OR" provides a search wherein a match is accorded when either the search term or any of the related terms are located in a given web page.

With regard to the "NOT" search operator, this operator enables a search wherein a match is accorded when a search term or related search term is specifically not found in a particular web page. Additionally, the search operator "NEAR" allows for a search wherein a match is accorded when two terms are within "x" number of words of each other in the web page. Moreover, different search operators can be combined and intermixed together in the generation of a reformulated search query. For example, a combined search operator query could be: "INTEL® near PENTIUM® and INTC". Accordingly, a web page is considered a match when INTEL® is within "x" number of words of each other and when INTC is not found in the web page. The prior examples of search operators and combinations thereof are by way of example and not by way of limitation, as other types of search operators as well as different combinations of search operators could be included in the reformulated search queries.

In an embodiment, in addition to entering a search term or phrase in box 404 of web page 402, web page 402 could include a selection criteria, such as a radio box, which enable client 106 to indicate the level of detail and/or number of web pages to be returned from the search query. For example, a radio box could be included in web page 402 that enables client 106 to enter one of three options for level of detail: (1) high, (2) medium or (3) low. Accordingly, this option allows client 106 to control the number of web pages returned by the search result. In particular, if the level of detail is low, server 104 could incorporate more AND search operators into the reformulated search query in order to narrow the search. Conversely, if client 106 wants a high level of detail, server 104 could incorporate more OR search operators into the reformulated search query in order to expand the search.

In one embodiment, server 104 generates the reformulated search query based on a set of parameters. For example, server 104 could be designed to incorporate all related terms into the reformulated search query using an OR search operator. In further illustration, server 104 could be designed to incorporate all related items employing an AND search operator.

Moreover, in an embodiment, server 104 generates the reformulated search query based on the type of semantic relationship between the search term and the related term. In particular, web site 220 may be set up to incorporate the related terms that have certain types of semantic relationships with the search term. For example, only the related terms that have a semantic relationship of "product of" may be incorporated into the reformulated search query. The above-described examples and illustration of the reformulation of the search query at process block 304 are by way of illustration and not by way of limitation, as other types methods may be employed in the reformulation of this search query.

Returning to method 300, once the search query has been reformulated, database 208 is searched to locate the web pages that match the terms in the reformulated search query at process block 306. In particular, database 208 includes key data terms and phrases from particular documents from web pages across network 102. In one embodiment, database 208 is generated using software programs, termed crawlers or spiders, that automatically traverse, on a periodic basis, the WWW through the different web sites thereon based on hyperlinks among the different web sites. When these software programs locate a web site whose information is not stored in database 208 for this particular search engine, such programs transmit key data terms/phrases and other relevant information concerning the documents found on the new web site back to the web site executing these programs. Accordingly, this information about the new websites is stored into database 208 for website 220.

Upon locating the relevant documents from the web pages that have terms that match the terms in the reformulated search query, search engine 212 retrieves "N" number of such documents for display to the user of web site 220. In one embodiment, the user of web site 220 defines "N". Moreover, in an embodiment, search engine 212 orders such documents for display based on relevancy to the reformulated search query. In one such embodiment, relevancy is based on how many times the search terms and related terms in the reformulated search query are found in a given document.

Additionally, summarizer unit 214 generates a summary for each of these documents. In one embodiment, the summary is the leading text of a given document. For example, the summary could be the first 500–100 words of the particular document. In an alternative embodiment, summarizer unit 214 generates the summary based on key sentences within the given document. In one such embodiment, the weight of each sentence within a given document is calculated based on how frequent the search terms within the query are found in the sentence. Accordingly, the more frequent the search terms are found in a sentence, the more weight is given to that sentence.

Summarizer unit 214 ranks the sentences based on these calculated weights, with the higher rank being assigned to the sentences with greater weights. In one embodiment, the summary is, for example, the first five highest ranked sentences. However, embodiments of the present invention are not so limited, as other techniques can be employed to determine the summary. For example, the summary could be the first 50–100 words based on the ranking of the sentences. Accordingly, if the first two highest ranked sentences include 100 words, then these two sentences define the summary.

In an embodiment, in addition to this summary, the headlines or titles for the documents are also displayed at process block 308. In one embodiment, the key words and the related words are also displayed at process block 308. This user of search engine 212 has an opportunity to select one of the related terms, at process decision block 310. If the user is satisfied with the search and the results thereof, the process is complete, at process block 314.

However, if the user wants to find different documents based on a new search, they can select one of the related terms for a new query. Search engine 212 receives this selection of a new query, at process block 312. Search engine 212 reformulates a new search query based on this new term, at process block 304. Accordingly, web site 220 performs a recursive process of receiving a new search term, reformulating the query and displaying the search results until the user is satisfied with their search. Further, in an embodiment, differing weights are assigned to the search terms and the related terms in order to place different emphasis on such terms during the search. In one such embodiment, search engine 212 places greater weight on those related terms that the user selected during the recursive searching process. For example, a related term, which the user selected, may only need to be found in a given document once, while the other terms in the reformulated search query may be required to be found multiple times in order for a given document to be considered a match. However, embodiments of the present invention are not so limited as other techniques may be incorporated into embodiments of the present invention to provide for differing weights among the different terms of the reformulated search query.

In one embodiment, web site 220 includes conversion unit 219 Conversion unit 219 allows the user to not only read, but also hear, the search results, as conversion unit 219 converts the text of the search results to speech. Accordingly, any type of user, including a novice, can use embodiments of web site 220 to search across vast numbers of web sites located on servers 104 across network 102 to find particular information in documents therein.

Moreover, the above-description was described in terms of the Internet and the WWW. However, this description was by way of example and not by way of limitation, as embodiments of the present invention are applicable to any other type of network that includes server-type computers that store data information that can be retrieved by client computers. For example, in one embodiment, network 102 could be a local area network with multiple servers and clients coupled thereto.

Memory 202 includes a machine-readable medium on which is stored a set of instructions (i.e., software) embodying any one, or all, of the methodologies described above. Software can reside, completely or at least partially, within memory 202 and/or within processing unit 204. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. For example, the above-described embodiments were described in terms of the English language. However, such embodiments can be incorporated and be applicable to any other language. Accordingly, the specification and drawings are to be regarded in an illustrative rather than a restrictive sense.

The invention claimed is:

1. A method comprising:
    receiving a search term for a query;
    searching a network of concept terms for terms related to the search term, wherein each related term and the search term appear together in at least one sentence in a web page;
    reformulating the query using the search term and the related terms before performing a search for documents based on the search term;
    searching a local database for data terms that match the search term and the related terms, wherein the data terms are generated based on occurrence frequencies within a document residing on the web sites located on server connected to, wherein the occurrence frequencies include mutual information associated with a first term and a second term within a given web page using a predetermined algorithm, wherein the mutual information is determined based on one or more weight factors of the first and second terms, the one or more weight factors representing occurrence frequencies of the respective term, and wherein the mutual information (MI) of the first term x and the second term y is determined by $MI(x, y)=f(x,y)/f(x)+f(y)-f(x, y)$, wherein $f(x, y)$ corresponds to an occurrence frequency of both the first term and the second term, wherein $f(x)$ corresponds to an occurrence frequency of the first term, and wherein $f(y)$ corresponds to an occurrence frequency of the second term; and
    in response to matching data terms with the search terms and related terms corresponding to the data terms, retrieving the documents from the respective websites.

2. The method of claim 1, further comprising displaying the retrieved documents, the search terms and the related terms, wherein at least one of the related terms includes a link, when activated, a further search of concept terms is conducted and one or more further related terms are presented, and wherein searching the local database and retrieving the documents are literately performed based on the further related terms.

3. The method of claim 1, further comprising generating a summary of the documents for the searched terms that match the search term and the related terms.

4. The method of claim 3, wherein the summary includes the searched terms and a beginning portion of the documents.

5. The method of claim 1, wherein the network is the Internet.

6. The method of claim 1, wherein the network of concept terms includes links between related terms, wherein the links are based on semantic relationships.

7. The method of claim 6, wherein the semantic relationships are selected from a group consisting of canonical, synonym, hyponym, hypernym, part, product and member.

8. The method of claim 1, wherein related terms are more specific than the search term.

9. The method of claim 1, wherein the occurrence frequencies include mutuality between words within the documents.

10. The method of claim 1, wherein the related terms are different than the search term and have similar meaning of the search term.

11. The method of claim 1, wherein the search term includes a name of an organization, and wherein the related terms include at least one of a name of subsidiaries of the organization, a product name of the organization, and a stock symbol of the organization.

12. The method of claim 1, wherein the occurrence frequencies include mutual information associated with a first term and a second term within a given web page based on a predetermined algorithm.

13. The method of claim 12, wherein the mutual information is determined based on one or more weight factors of the first and second terms, the one or more weight factors representing occurrence frequencies of the respective term.

14. A machine-readable storage medium having instructions, when executed by a machine, causes the machine to perform a method, the method comprising;
    receiving a search term for a query;
    searching a network of concept terms for terms related to the search term, wherein each related term and the search term appear together in at least one sentence in a web page;
    reformulating the query using the search term and the related terms before performing a search for documents based on the search term;
    searching a local database for data terms that match the search term and the related terms, wherein the data terms are generated based on occurrence frequencies within a document residing on web sites located on server connected to, wherein the occurrence frequencies include mutual information associated with a first term and a second term within a given web page using a predetermined algorithm, wherein the mutual information is determined based on one or more weight factors of the first and second terms, the one or more weight factors representing occurrence frequencies of the respective term, and wherein the mutual information (MI) of the first term x and the second term y is determined by $MI(x, y)=f(x,y)/f(x)+f(y)-f(x, y)$, wherein $f(x, y)$ corresponds to an occurrence frequency of both the first term and the second term, wherein $f(x)$ corresponds to an occurrence frequency of the first term, and wherein f(y) corresponds to an occurrence frequency of the second term; and in response to matching data terms with the search terms and related terms corresponding to the data terms, retrieving the documents from the respective websites.

15. The machine-readable storage medium of claim 14, further comprising displaying the retrieved documents, the search terms and the related terms, wherein at least one of the related terms includes a link, when activated, a further search of concept terms is conducted and one or more further related terms are presented, and wherein searching the local database and retrieving the documents are literately performed based on the further related terms.

16. The machine-readable storage medium of claim 14, further comprising generating a summary of the documents for the searched terms that match the search term and the related terms.

17. The machine-readable storage medium of claim 16, wherein the summary includes the searched terms and a beginning portion of the documents.

18. The machine-readable storage medium of claim 14, wherein the network is the Internet.

19. The machine-readable storage medium of claim 14, wherein the network of concept terms includes links between related terms, wherein the links are based on semantic relationships.

20. The machine-readable storage medium of claim 19, wherein the semantic relationships are selected from a group consisting of canonical, synonym, hyponym, hypernym, part, product and member.

21. The machine-readable storage medium of claim 14, wherein related terms are more specific than the search term.

22. The machine-readable storage medium of claim 14, wherein the occurrence frequencies include mutuality between words within the documents.

23. The machine-readable storage medium of claim 14, wherein the related terms are different than the search term and have similar meaning of the search term.

24. The machine-readable storage medium of claim 14, wherein the search term includes a name of an organization, and wherein the related terms include at least one of a name of subsidiaries of the organization, a product name of the organization, and a stock symbol of the organization.

25. The machine-readable storage medium of claim 14, wherein the occurrence frequencies include mutual information associated with a first term and a second term within a given web page based on a predetermined algorithm.

26. The machine-readable storage medium of claim 25, wherein the mutual information is determined based on one or more weight factors of the first and second terms, the one or more weight factors representing occurrence frequencies of the respective term.

* * * * *